June 6, 1972     A. C. S. HOWE     3,667,737
ENTRAINMENT OF A FLUID MEDIUM OR OTHER ADDITIVE IN A LIQUID
OR OTHER FORMULATION
Filed Nov. 28, 1969     2 Sheets-Sheet 1
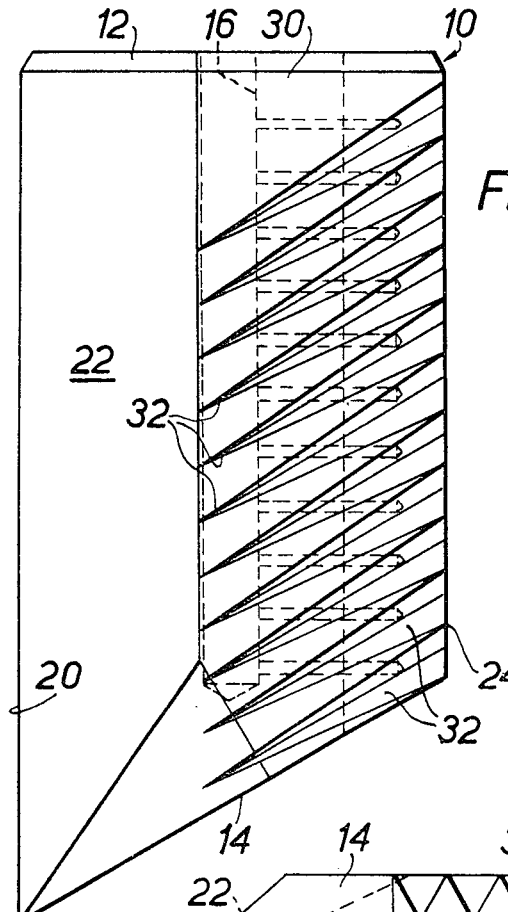
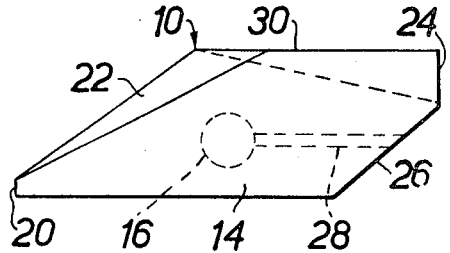
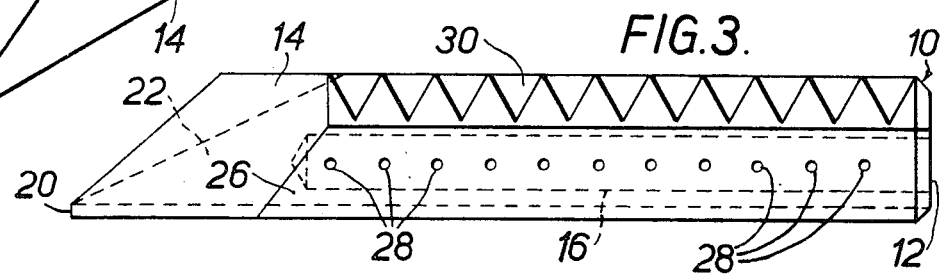
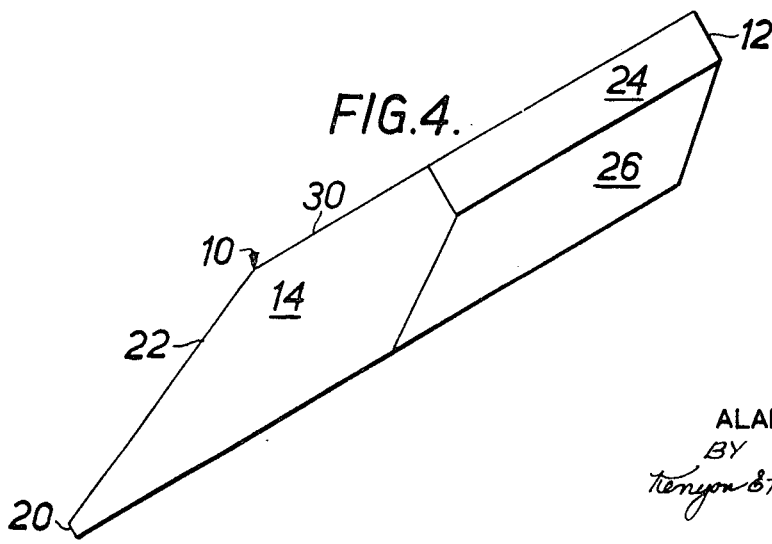
INVENTOR.
ALAN COLIN SCOTT HOWE.
BY
Kenyon & Kenyon Reilly Carr & Chapin
ATTORNEYS

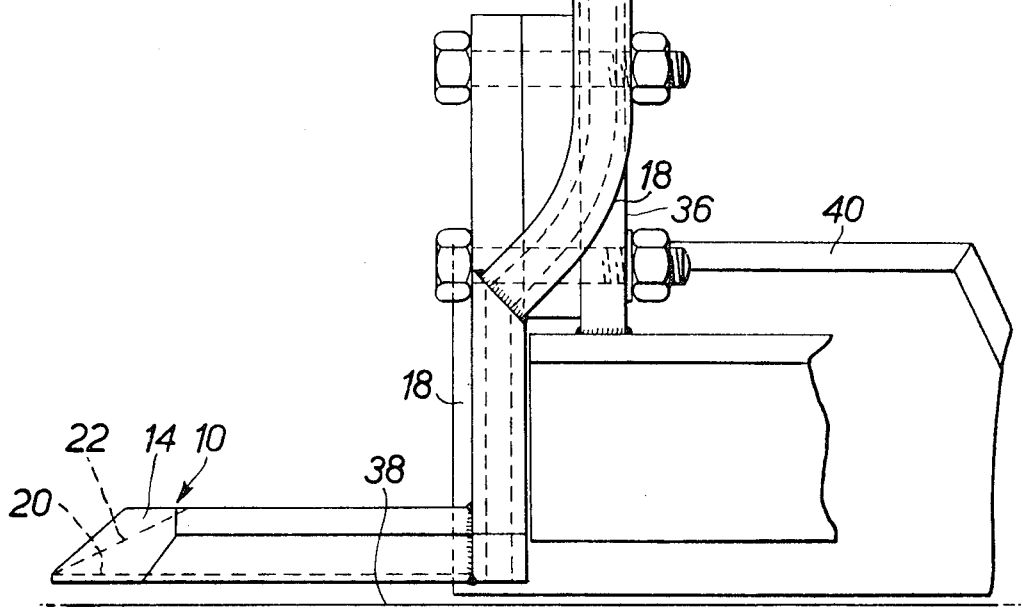

United States Patent Office 3,667,737
Patented June 6, 1972

3,667,737
ENTRAINMENT OF A LIQUID MEDIUM OR OTHER ADDITIVE IN A LIQUID OR OTHER FORMULATION
Alan Colin Scott Howe, Hemel Hempstead, England, assignor to John Laing & Son Limited, London, England
Filed Nov. 28, 1969, Ser. No. 880,682
Claims priority, application Great Britain, Nov. 30, 1968, 56,951/68
Int. Cl. B28c 5/10
U.S. Cl. 259—164                                             2 Claims

ABSTRACT OF THE DISCLOSURE

A cavitation element for inducing cavitation in, for example, a wet concrete mix. The element has a smooth upstream profile and a bluff downstream profile with formations on its upper surface which induce a corrugated shape to the envelope of the cavitation immediately downstream of the bluff profile. An inlet within the element communicates with a number of apertures opening into the bluff profile whereby a jet, or jets, of fluid or other additive are supplied through the apertures into cavitation induced by the bluff profile.

---

This invention relates to the entrainment of a fluid medium or other additives in a liquid or particulate phase with particular—although not exclusive—reference to wet mixtures of solid ingredients such as mortars and concretes. It is, however, more generally applicable in other fields such as foodstuffs, medicaments or industrial solutions or suspensions.

In this specification, the term "entrainment" is used to denote the occlusion or random dispersion of any gas, liquid or other additive in a liquid or other formulation. For the sake of convenience, gas will be referred to hereinafter generally as air.

In the manufacture of air entrained mortars and concretes, a surface active agent such as N.V.R. is normally added to the gauging water and the ingredients are agitated for a sufficient period to expose the maximum surface area of the mix to atmosphere so as to ensure the desired air entrainment. In most conventional concrete mixers, such agitation requires an elapsed time of about three minutes to produce a degree of air entrainment of about 30% in a mix of the proportions set out below.

It is an object of the present invention to reduce this period or to increase the level of air entrainment or both.

More generally stated, it is an object of the present invention to provide a method of and means for entraining concrete or other formulation with a fluid or other additive more efficiently than has been possible hitherto.

To this end, the method according to the present invention of entraining concrete or other formulation with a fluid or other additive which comprises the steps of:

(i) Agitation of a wet concrete mix or other formulation having a free upper surface so as to establish continuous cavitation within the mix or formulation at a known submerged location, (ii) Injecting a jet of fluid or other additive continuously into the submerged cavitation at a rate less than would cause eruption thereof from the surface of the mix or formulation.

Preferably, the wet concrete mix or other formulation to be agitated is caused to flow continuously over a submerged cavitation element having a streamlined upstream profile and a bluff downstream profile at a rate which ensures continuous cavitation downstream of the bluff profile.

Advantageously, where one or more of the starting materials is in the dry state, it is introduced into the agitator first and agitation is commenced before the introduction of the fluid or other additive.

Conveniently, the cavitation element is continuously propelled, in the fully submerged state, through the wet concrete mix or other formulation.

The invention also envisages the provision of a cavitation element for inducing cavitation in, for example, a wet concrete mix and comprising a smooth upstream profile, a bluff downstream profile, and air inlet means within the cavitation element communicating with a number of apertures opening into the bluff downstream profile whereby a jet or jets of fluid or other additive can be supplied through said apertures into cavitation induced by the bluff downstream profile.

Such a cavitation element may also be provided with scoring or channelling formations on its upper surface adapted to encourage a corrugated shape to the envelope of a cavitation zone immediately downstream of the bluff profile. Such formations may, for example, be in the form of V-section grooves, which increase progressively in depth from zero depth at the end nearest the upstream profile to a maximum depth at the end nearest the downstream profile.

The invention will now more fully be described, by way of example only, with reference to one practical embodiment illustrated in the accompanying drawings in which:

FIG. 1 is a plan view of a cavitation element;
FIGS. 2 and 3 are end and front elevations respectively of FIG. 1;
FIG. 4 is a perspective view seen on the arrow A on FIG. 1, and
FIG. 5 is a rear elevation of the element of FIGS. 1 to 4 mounted in position on the beater arm of a proprietory mixer.

The drawings illustrate a cavitation element designed for and fitted to a well known make of concrete mixer. The same design of element was also tested in two other makes of conventional mixer. With the element in position, three sets of tests were conducted using standard cement and mortar mixes as follows:

|  | Proportions | Batch (lb.) |
|---|---|---|
| Standard concrete mix: | | |
| Cement O.P. | 1.00 | 42.00 |
| Sand | 2.01 | 84.00 |
| ⅜ inch | 0.90 | 38.00 |
| ¾ inch | 2.69 | 113.00 |
| Water | 0.55 | 23.00 |
| N.V.R. | [1] 6 | [1] 252 |
| Standard mortar mix: | | |
| Cement O.P. | 1.00 | 50.00 |
| Sand | 5.00 | 250.00 |
| Water | 0.50 | 25.00 |
| N.V.R. | [1] 6 | [1] 300 |

[1] Cubic centimeters.

The test batches were mixed wet with the cavitation element in place but inoperative as an injector for three minutes to provide a reference or control sample against which to compare the efficacy of the present invention. The degree of air entrainment was calculated by the gravimetric method using the fresh wet densities of the control sample and of the aerated sample.

When mixing in accordance with the present invention, a first series of tests was run starting with the ingredients wet. The same test was then repeated but starting with the ingredients dry and adding the gauging water dosed with N.V.R. through the holes or nozzles in the cavitation element under pressure from the compressed air supply which was allowed to continue until air entrainment had proceeded to the required level.

The cavitation element was mounted on the arm of a beater or paddle so as to be totally immersed in the wet mix. The supporting arm which also carries the standard paddle or beater, was driven in conventional manner at a speed sufficient to produce cavitation in the liquid mix.

Referring now to FIGS. 1 to 4 of the drawings. The cavitation element shown consists of a generally rhomboid-shaped body 10 having one end 12 machined square and vertical and the other end 14 chamfered at 30°, to the plane of the end wall 12. The body 10 is counterbored at 16 from the end wall 12 to provide a compressed air manifold adapted to be connected to a compressed air supply line 18 (see FIG. 5). The bore 16 is blind and terminates short of the chamfered wall 14.

The upstream side (regarded in the direction of relative flow of slurry over the cavitation element) of the cavitation element 10 is chamfered to a relatively shallow leading edge 20 to present a substantially streamlined upstream profile 22. The downstream side of the element 10 is bluff and comprises an upper substantially square wall portion 24 and a plane undercut lower wall portion 26. Through the latter open a series of small bore ducts or nozzles 28 which communicate with the counterbore 16 at their inner ends.

The top surface 30 of the element 10 is grooved at 32 to present progressively deepening V-section grooves of about 60° included angle which start at zero depth immediately behind the streamline upstream surface 22 and increase in depth until they break through the wall 24. The line of each of the grooves 32 is parallel to the chamfered end 14.

As shown in FIG. 5, the element 10 is mounted on the bottom of the conventional beater arm 36 of a mixer so that it lies close to the surface of the bottom wall 38 of the mixer pan. When the mixer is started and the paddles or beaters are rotated, the cavitation element 10 is carried with one of the paddles or beaters (shown at 40 in FIG. 5) and compressed air is pumped through the pipe 18 into the manifold 16 and emerges as a source of jets through the ducts or nozzles 28 in the bluff profile portion 26. The speed of rotation of the paddles or beaters is such that cavitation occurs downstream of the bluff profile 24, 26 of the cavitation element and air blown in through the ducts 28 impinges on the continuously collapsing envelope of the mix at a point where the ingredients are in a highly turbulent state so that the maximum enveloping of air by the ingredients takes place. As the ingredients pass over the top surface 30 of the cavitation element, channels are formed in the envelope at the cavitation zone so as to increase the active surface of the envelope exposed to the action of the high velocity air jets.

The results of the tests showed that in the control samples, a maximum of 27% air entrainment was achieved in three minutes of conventional mixing. The tests starting from a wet mix produced a maximum of 30% air entrainment in 1½ minutes, whilst the tests starting with dry ingredients and injecting the gauging water dosed with N.V.R. first under the action of the compressed air which subsequently provided the air jets, the same improvement in air entrainment was achieved in one minute.

The numbers and proportions of both the ducts 28 and the grooves 32, and the angle between their respective axes, may be varied to suit different operating conditions. The pressure of air required must be such as to at least overcome the hydraulic head acting on the jets 28 during the mixing operation. Some of the injected air will probably escape from the mix, but the turbulence at the envelope of the cavitation zone, combined with the channelling of the envelope effected by the lands between adjacent grooves 32, serves to present to the incoming air a highly favourable entrainment condition.

The proper functioning of a system according to the present invention depends on a transfer of momentum from the air jets to the liquid phase of the relatively static mix. Hence it is necessary to know the mean density of the mix and the hydrostatic pressure at the level of the ducts or nozzles 28 in order to establish the velocity of the jet at which air will erupt from the surface of the mix. Such eruption indicates an air velocity in excess of that at which the injected air can be captured or entrained by the mix.

I claim:

1. A cavitation element comprising a smooth upstream profile, a bluff downstream profile, inlet means within the cavitation element communicating with a number of apertures opening into said bluff downstream profile for supplying at least one jet of an additive through said apertures into a cavitation induced by said bluff downstream profile, and an upper surface having a scoring formation thereon; said element being of a shape whereby said scoring formation induces a corrugated shape to at least a portion of the envelope of the cavitation immediately downstream of said bluff profile.

2. A cavitation element is claimed in claim 1 in which said formation is in the form of a V-section groove which increases progressively in depth from zero depth at the end nearest said upstream profile to a maximum depth at the end nearest said downstream profile.

References Cited

UNITED STATES PATENTS

| 84,901 | 12/1868 | Pease | 259—23 |
| 3,081,983 | 3/1963 | Thibodeaux | 259—178 A |
| 3,168,296 | 2/1965 | Cowley | 259—178 A |
| 573,562 | 12/1896 | Wittram | 416—235 |

ROBERT W. JENKINS, Primary Examiner

U.S. Cl. X.R.

259—23, 178 A